United States Patent [19]

Bennett, Jr. et al.

[11] 4,196,278

[45] Apr. 1, 1980

[54] METHOD FOR THE CONTROLLED POLYMERIZATION OF POLYPHENYLENE OXIDE POLYMERS

[75] Inventors: James G. Bennett, Jr.; Glenn D. Cooper, both of Delmar, N.Y.

[73] Assignee: General Electric Company, Pittsfield, Mass.

[21] Appl. No.: 865,392

[22] Filed: Dec. 29, 1977

[51] Int. Cl.² .................................................. C08G 65/44
[52] U.S. Cl. ............................. 528/215; 528/212; 528/216; 528/217
[58] Field of Search .................. 260/47 ET; 528/215, 528/216, 212, 217

[56] References Cited

U.S. PATENT DOCUMENTS

| | | | |
|---|---|---|---|
| 3,219,626 | 11/1965 | Blanchard et al. | 528/212 |
| 3,257,357 | 6/1966 | Stamatoff | 528/212 |
| 3,257,358 | 6/1966 | Stamatoff | 528/212 |
| 3,306,874 | 2/1967 | Hay | 528/212 |
| 3,306,875 | 2/1967 | Hay | 528/212 |
| 3,337,499 | 8/1967 | Bussink et al. | 528/212 |
| 3,342,892 | 9/1967 | Laakso et al. | 260/823 |
| 3,344,116 | 9/1967 | Borman | 528/212 |
| 3,356,761 | 12/1967 | Fox | 260/874 |
| 3,365,422 | 1/1968 | Van Dort | 528/212 |
| 3,382,212 | 5/1968 | Price et al. | 528/212 |
| 3,383,435 | 5/1968 | Cizek | 260/874 |
| 3,384,619 | 5/1968 | Hori et al. | 528/212 |
| 3,440,217 | 4/1969 | Faurote et al. | 528/212 |
| 3,442,885 | 5/1969 | Wieden et al. | 528/212 |
| 3,455,880 | 7/1969 | Kobayashi et al. | 528/212 |
| 3,544,515 | 12/1970 | Katchman et al. | 528/212 |
| 3,573,257 | 3/1971 | Nakashio et al. | 528/212 |
| 3,639,656 | 2/1972 | Bennett et al. | 528/212 |
| 3,642,699 | 2/1972 | Cooper et al. | 528/212 |
| 3,661,848 | 5/1972 | Cooper et al. | 528/212 |
| 3,730,944 | 5/1973 | Bennett et al. | 528/212 |
| 3,733,299 | 5/1973 | Cooper et al. | 528/212 |
| 3,749,693 | 7/1973 | Cooper | 528/212 |
| 3,787,361 | 1/1974 | Nakashio et al. | 528/212 |
| 3,787,362 | 1/1974 | Bennett et al. | 528/212 |
| 3,838,102 | 9/1974 | Bennett et al. | 528/212 |
| 3,914,266 | 10/1975 | Hay | 528/212 |
| 3,956,242 | 5/1976 | Olander | 528/212 |
| 3,962,108 | 6/1976 | Yonemitsu et al. | 260/47 ET |
| 3,972,851 | 8/1976 | Olander | 528/212 |
| 3,988,297 | 10/1976 | Bennett et al. | 528/212 |
| 4,032,512 | 6/1977 | Bennett et al. | 528/212 |
| 4,042,564 | 8/1977 | Bennett et al. | 528/212 |

FOREIGN PATENT DOCUMENTS 1291609  10/1972  United Kingdom .................... 528/212

*Primary Examiner*—Lester L. Lee
*Attorney, Agent, or Firm*—Morgan, Finnegan, Pine, Foley & Lee

[57] ABSTRACT

A novel process is described for the control of molecular weight in the preparation of polyphenylene oxide polymers. The process is based on the slow addition of additional amounts of a monomeric phenol to a polyphenylene oxide polymerization reaction mixture which comprises a main charge of a monomeric phenol, a polyphenylene oxide polymerization catalyst and a solvent, while continuing polymerization.

22 Claims, No Drawings

METHOD FOR THE CONTROLLED POLYMERIZATION OF POLYPHENYLENE OXIDE POLYMERS

This invention is concerned with a novel process for the control of molecular weight in the preparation of polyphenylene oxide polymers. The process is based on the discovery that the slow addition of additional amounts of a monomeric phenol to a polyphenylene oxide polymerization mixture which comprises a main charge of a monomeric phenol, a polyphenylene oxide polymerization catalyst and a solvent, may be utilized to control the molecular weight of the polymer, while continuing polymerization.

BACKGROUND OF THE INVENTION

Compositions of polyphenylene oxides and alkenyl aromatic resins are known in the art. The polyphenylene oxides are disclosed in Hay, U.S. Pat. No. 3,306,874 and U.S. Pat. No. 3,306,875; U.S. Pat. No. 3,914,266 and in Stamatoff, U.S. Pat. No. 3,257,357 and Pat. No. 3,257,358. In the Hay patents, the polyphenylene oxides are prepared by an oxidative coupling reaction comprising passing an oxygen-containing gas through a reaction solution of a phenol and a metal-amine complex catalyst. Other disclosures relating to processes for preparing polyphenylene oxide resins, including graft copolymers of polyphenylene oxide resins with styrene type compounds, are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laasko et al, U.S. Pat. No. 3,342,892; Borman U.S. Pat. No. 3,344,166; Hori et al, U.S. Pat. No. 3,384,619; Faurote et al, U.S. Pat. No. 3,440,217; Olander, U.S. Pat. No. 3,956,242, and disclosures relating to metal based catalysts which do not include amines, are known from patents such as Wieden et al, U.S. Pat. No. 3,442,885 (copper-amidines); Nakashio et al, U.S. Pat. No. 3,573,257 (meta-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide etc., are described in Price et al, U.S. Pat. No. 3,382,212, Cizek, U.S. Pat. No. 3,383,435 discloses polyphenylene oxide resin compositions.

Other procedures for the preparation of polyphenylene oxides are described in Van Dort, U.S. Pat. No. 3,365,422; Bennett and Cooper, U.S. Pat. No. 3,639,656; U.S. Pat. No. 3,642,699; U.S. Pat. No. 3,733,299; U.S. Pat. No. 3,838,102; U.S. Pat. No. 3,661,848; U.S. Pat. No. 4,042,564; U.S. Pat. No. 4,032,512 and in Ser. No. 718,834, all of which are incorporated by reference.

The above referenced patents generally disclose procedures for the preparation of high molecular weight polyphenylene oxide polymers. These high molecular weight polymers have an intrinsic viscosity of above about 0.45 dl/g as measured in chloroform at 30° C. and are exemplified by poly(2,6-dimethyl-1,4-phenylene oxide.)

The polymerization procedures that are generally used comprise the use of oxygen in the coupling of phenolic monomers in the presence of a catalyst and a solvent. Two methods that have been employed to control the molecular weight of the polymer comprise the termination of the polymerization after a short reaction time or the limitation of the amount of available catalyst. The use of short reaction times gives poorly reproducible results because the molecular weight changes rapidly during the early stages of the polymerization reaction. The use of small amounts of catalyst has resulted in the formation of large amounts of highly colored diphenoquinones.

U.S. Pat. No. 3,962,180 describes a process for the preparation of low mol. weight polyphenylene oxides which is based on the continuous addition of a phenolic monomer to a reaction mixture which contains solvent and catalyst. This process is limited to the preparation of low molecular weight polymers.

The applicants have discovered that by the slow addition of a small amount of a phenolic monomer to a polymerizing reaction mixture which comprises a polyphenylene oxide polymerization catalyst, a main charge of a phenolic monomer and a solvent, a polyphenylene oxide polymer of a preselected molecular weight may be obtained. The molecular weight of the polymer is a function of the rate at which that additional phenolic monomer is added during polymerization. This type of reaction is reproducible and may be employed with copper-amine or complex manganese catalysts.

The process of the invention is particularly useful with highly active catalyst systems such as those described in U.S. Pat. No. 3,956,242 or U.S. Pat. No. 3,914,266 which can produce an increase in the intrinsic viscosity of a polyphenylene oxide of from 0.2 to up to 0.8 dl/g as measured in chloroform at 30° C., in less than five minutes. These processes are characterized by a sudden and rapid polymer growth which tends to make it difficult to control molecular weight. By the use of the process of this invention, these processes may be easily controlled so that polymer of a specified molecular weight may be prepared.

Accordingly, it is a primary object of this invention to provide an improved method for the preparation of polyphenylene oxide polymers.

It is also an object of this invention to provide a method for controlling the molecular weight of polyphenylene oxide polymers.

DETAILED DESCRIPTION OF THE INVENTION

The process of the invention is concerned with a method for the preparation of a polyphenylene oxide polymer having a predetermined molecular weight. This process comprises the steps of:

(a) adding oxygen to a mixture comprising a main charge of a phenolic monomer, an oxidative coupling catalyst and a solvent;

(b) while continuing the addition of oxygen to the mixture of step (a), adding to said reaction mixture an additional amount of phenolic monomer at a rate that is sufficient to control polymerization and produce a polyphenylene oxide polymer of a predetermined molecular weight.

If the additional monomer is added at a rapid rate, low polymer will be obtained as described hereinafter.

The phenolic monomers that are useful in the practice of the invention include compounds of the formula:

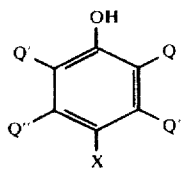

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus; hydrocarbonoxy radicals and halohydrocarbonoxy radicals having at least two carbon atoms between the halogen atom and the phenol nucleus; Q' and Q" are the same as Q and in addition may be halogen, with the proviso that Q, Q' and Q" are all free of a tertiary alpha-carbon atom.

The phenolic monomers may be employed to form polyphenylene oxides of the formula:

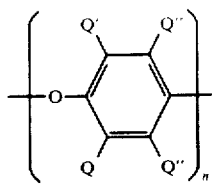

wherein Q, Q' and Q" are the same as hereinabove defined; the oxygen atom is bonded directly to the phenylene group of the adjacent unit and n is an integer of at least 10.

The preferred phenolic monomer is 2,6-xylenol which is used to produce poly(2,6-dimethyl-1,4-phenylene oxide).

The particular reaction solvent is not critical and solvents such as toluene, benzene, chloroform and the like may be employed. Other solvents are mentioned in the above referenced Hay patents.

The copper amine catalysts are described in the Hay patents and may comprise a cuprous compound such as cuprous chloride, cuprous bromide, cuprous sulfate, cuprous oxide cuprous tetramine sulfate, cuprous acetate, cuprous butyrate, cuprous toluate, cuprous chloride, cupric bromide, cupric sulfate, cupric azide, cupric oxide, cupric tetramine sulfate, cupric acetate, cupric butyrate, cupric toluate, and the like. Cupric bromide and cupric chloride are the preferred copper compounds.

The amine may be a primary, secondary or tertiary amine or a combination of a diamine, wherein the amino nitrogens are separated by from two to three carbon atoms, a bromide ion and a tertiary amine with or without a secondary dialkyl monoamine. These amines are disclosed in the U.S. Pat. No. 3,306,874; U.S. Pat. No. 3,306,875; U.S. Pat. No. 3,914,266 and Ser. No. 718,834. A preferred amine is di-n-butylamine.

Generally from about 0.2 to about 2.5 moles of copper compound may be employed per 100 moles of phenolic monomer with about 2.0 to about 25.0 moles of primary or secondary amine per 100 moles of phenolic monomer. With tertiary amines as the only amine from about 500 to about 1500 moles of tertiary amine per 100 moles of phenolic monomer may be employed in combination with from about 4 to about 15 moles of copper compound per 100 moles of phenolic monomer.

Promoters such as alkali metal bromides or dialkylformamides as disclosed in U.S. Pat. No. 3,730,944 U.S. Pat. No. 3,544,515; U.S. Pat. No. 3,988,297 or U.S. Pat. No. 3,787,362 may also be employed.

The diamine-tertiary amine-bromide ion catalyst system may include an diamine of the formula:

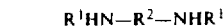

wherein each $R^1$, is independently isopropyl, a $C_{4-8}$ tertiary alkyl or a cycloalkyl group having no hydrogens on the alpha-carbon atom and $R^2$ is $C_{2-4}$ alkylene or $C_{3-7}$ cycloalkylene. Examples of these compounds include N,N'-di-tert-butylethylenediamine N,N'-di-tert-amylethylenediamine; and N,N'-di-isipropylethylenediamine. The tertiary amine component is preferably one having low steric requirements such as a tri-lower alkyl amine wherein the alkyl groups have from 1 to 6 carbon atoms. Examples of these compounds include trimethyl amine and n-butyldimethylamine. When the diamines are used, the copper compounds may be used at a ratio of phenolic monomer to copper ion of 750:1 to 1400:1.

If desired a secondary amine of the formula:

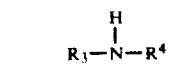

wherein $R^3$ and $R^4$ are independently delected from the group consisting of lower alkyl of from 1 to 12 carbon atoms, and preferably lower alkyl of from 3 to 6 carbon atoms, may be added to modify properties of the product produced with this catalyst. The secondary amine may be employed at a weight ratio of from 50:1 to 500:1 of phenolic monomer to secondary amine. The molar ratio of phenolic monomer to copper is from 400:1 to 1500:1 while the tertiary amine may vary from 10–40 moles/g. atom of copper. The bromide ion is employed at a ratio of 5:1 to 50:1 atoms of bromide per atom of copper.

The preferred manganese complex catalyst is a hydroxyoxime complex with manganese as described in U.S. Pat. No. 3,956,242 although other manganese complex catalysts may be employed such as those disclosed in U.S. Pat. No. 3,972,851; Ser. Nos. 753,501; 753,507 and 753,562.

Although the nature of the particular manganese catalyst is not critical one may employ a complex manganese catalyst of the formula:

wherein L is an hydroxyoxime ligand of the formula:

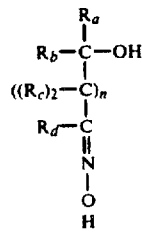

wherein $R_a$, $R_b$, $R_c$ and $R_d$ are independently selected from the group conisting of hydrogen, acyclic and cyclic hydrocarbon radicals, and n is a positive integer equal to 0 or 1, and is a positive number at least equal to about 10.

The preferred species of $R_a$, $R_b$, $R_c$ and $R_d$ are selected from the group consisting of hydrogen, acyclic and cyclic hydrocarbon radicals or acyclic and cyclic hydrocarbon radicals having electron-releasing constituents selected from the group consisting of $-NH_2$, $-NHR^1$, $-N(R^1)_2$, $-OH$, $-OR^1$ and $-OOCR^1$, wherein $R^1$ is an alkyl group of from 1 to 10 carbon atoms. Where acyclic or cyclic hydrocarbon radicals are employed, they should include from about 1 to about 30 carbon atoms. It is especially preferred that at least one of $R_b$ and $R_d$ are aromatic.

Preferred catalysts include those based on benzoin oxime, p-dimethylaminobenzoin oxime or 2-phenyl-2-hydroxy-butan-3-one oxime and manganese chloride (II). This type of catalyst is employed in a basic reaction media such as that provided by a strong alkali such as the alkali metal hydroxides, alkali metal alkoxides and the like. The amounts of alkali, complex manganese catalysts, and solvents are set forth in U.S. Pat. No. 3,956,242.

The process of the invention is carried out by forming a reaction mixture of the initial phenolic monomer charge, a solvent and a catalyst. An oxygen containing gas such as air or oxygen is introduced into the reactor, preferably at the bottom, to initiate the reaction.

The main phenolic monomer charge may be added all at once or it may be added under polymerization conditions, over a period of up to one hour. Generally the size of the reactor and the capacity of the available cooling means will dictate the rate at which the main charge is added. The amount of main charge will comprise from 85 to 99.9% by weight of the total amount of the monomer that is added during the reaction. Additional phenolic monomer or a solution of phenolic monomer in a compatible solvent is added to the reaction mixture. This phenolic monomer should preferably be the same as the phenolic monomer initially charged although any reactive phenolic monomer may be employed. The rate of addition of additional phenolic monomer is adjusted to promote the formation of polyphenylene oxides, having any desired intrinsic viscosity of 0.2–0.9 dl/g. as measured in chloroform at 30° C. The total of additional phenolic monomer will generally fall between 0.1–15.0% by weight and may be added at a rate of 0.2–15% by weight of the main phenolic monomer charged per hour of reaction time. The additional phenolic monomer shold be added at a constant rate of addition although this is not considered to be a critical aspect of the process.

The faster the rate of addition of additional phenolic monomer, the lower will be the molecular weight of the polyphenylene oxide obtained. All of these polymers are known and may be used for their known utilities which vary with the molecular weight. High molecular weight polymer, i.e., I.V. of 0.4 dl/g or higher, are molding resins and lower weight materials may be used as prepolymers for further polymerization or for the stabilization of polypropylene as shown in U.S. Pat. No. 3,749,693. Low mol. wt. polymers may also be copolymerized with polycarbonates.

DESCRIPTION OF THE INVENTION

The following examples illustrate the process of the invention. They are merely illustrative and are not to be construed as limitations on the present invention.

EXAMPLE 1

Catalyst solution is prepared as follows: 24.6 g of 2,6-xylenol is dissolved in 150 ml of methanol, 1.58 g of cuprous oxide is added and the suspension is cooled and stirred while 17.2 g of bromine in 25 ml of methanol is added over a period of 15 minutes. Stirring is continued for 30 minutes and the solution is diluted with methanol to a volume of 200 ml.

A one liter reactor is charged with 453 ml of toluene, 9 ml of the catalyst solution described above, 1.75 g of butyldimethylamine and 0.305 g of N,N'-di-tert-butylethylenediamine. A solution of 105 g of 2,6-xylenol in 123 ml of toluene is prepared. One quarter of this solution is added to the reactor. The mixture is vigorously stirred with a stream of oxygen introduced near the bottom of the reactor, and the remainder of the 2,6-xylenol solution is added over a period of 10 minutes. The temperature of the reaction mixture is maintained at 23° C. by circulating water from a constant-temperature bath through an internal coil. Samples of the reaction mixture are withdrawn at 35 and 45 minutes after the beginning of the reaction, diluted with toluene, stirred with 50% aqueous acetic acid, and centrifuged. The light phase is decanted and the polymer is precipitated by addition of methanol.

The procedure described above is followed in other reactions, except that after the addition of the initial monomer charge is completed a dilute (1–10%) solution of xylenol in toluene is slowly pumped into the polymerizing mixture during the polymerization. The results are listed in Table 1.

TABLE 1

| RATE OF MONOMER ADDITION (% hr of initial charge) | I.V. (dl/g) | | | |
|---|---|---|---|---|
| | 35 min | 45 min | 55 min | 65 min |
| A* None | .80 | .92 | — | — |
| B 10 | .29 | .26 | .22 | .21 |
| C 1.1 | .75 | .69 | .62 | .69 |
| D 2.2 | .48 | .44 | .40 | .39 |
| E 0.5 | .71 | .73 | .72 | .70 |

This example shows the effect on final molecular weight that is obtained with the fast and slow addition of additional monomer.

EXAMPLE 2

A control polymerization was carried out according to the following procedure.

A solution of 0.206 g of manganese chloride in 50 ml of methanol is mixed with a solution of 0.703 g of benzoin oxime in 50 ml of methanol. 14 g of 50% aqueous sodium hydroxide is dissolved in 228 ml of methanol. 25 ml of the sodium hydroxide solution is added to the manganese chloride-oxime solution and the mixture is stirred for five minutes. A one gallon reactor is charged with 280 ml of toluene and approximately 300 ml of a solution of 350 g of 2,6-xylenol in 1000 ml of toluene. The remainder of the sodium hydroxide solution is added to the reactor, followed by the manganese chloride-oxime solution and the mixture is vigorously stirred with a rapid stream of oxygen introduced near the bottom. The remainder of the xylenol solution is added over a period of 19 minutes, with the temperatures maintained at 26° C. by circulating water through an internal cooling coil. A sample is withdrawn at 45 minutes after the beginning of reaction, mixed with 20% sulfuric acid, and the polymer is precipitated by addition of methanol. The dried polymer has an intrinsic viscosity of 0.20 dl/g; after 55 minutes the intrinsic viscosity is 0.52 dl/g.

The procedure described above is duplicated, except that after the monomer addition is completed a 3.5% solution of xylenol in toluene added to the reactor, according to the present invention, at a rate equal to 1% per hr of the original charge. The intrinsic viscosity of the polymer is 0.38 dl/g after 55 minutes, 0.41 dl/g after 75 minutes.

der then added over the next fifteen minutes. A dilute solution of monomer is then added slowly as in example 1. In a typical example using a catalyst composed of 0.375 g of cupric chloride, 0.585 g of sodium bromide, and 16.35 g. of di-n-butyl amine, and with the monomer addition rate 1.5% of the initial charge per hour the intrinsic viscosity after 60 minutes is 0.27 dl/g, after 90 minutes 0.25 dl/g, after 120 minutes 0.26 dl/g, and after 150 minutes 0.27 dl/g. The yield of polymer after 120 minutes is 99% of theoretical.

The results of a number of experiments at varying flow rates are summarized in Table II.

It can be seen that as long as the other conditions are maintained constant, the molecular weight changes very little with increasing reaction time and that the molecular weight attained decreases as the rate of addition of additional monomer is increased.

TABLE II

| Catalyst ratio[a] | Monomer rate[b] | 60 min | 90 min | 120 min | 150 min | 180 min | Procedure |
|---|---|---|---|---|---|---|---|
| 300:1:2:45 | 0 | .32 | .48 | .57 | — | — | |
| 300:1:2:45 | 1% | .24 | .41 | .44 | .44 | — | Example 3 |
| 300:1:2:45 | 2% | .20 | .35 | .37 | .35 | — | " |
| 300:1:2:45 | 1.6% | .20 | .32 | .30 | — | — | |
| 300:1:2:45 | 0.4% | .19 | .20 | .20 | .22 | — | Example 4 |
| 200:1:2:45 | 0 | .48 | .64 | .72 | — | — | Example 3 |
| 200:1:2:45 | 0.2% | .45 | .56 | .66 | .68 | — | " |
| 200:1:2:45 | 0.3% | .50 | .59 | .63 | .61 | — | " |
| 200:1:2:45 | 0.6% | .48 | .55 | .57 | .56 | .53 | " |
| 200:1:2:45 | 1.6% | .40 | .43 | .40 | .39 | — | " |
| 200:1:2:45 | 1.8% | .41 | .43 | .41 | .38 | — | " |
| 200:1:2:45 | 1.5% | .27 | .25 | .26 | .27 | — | Example 4 |

[a] Molar ratio xylenol: cupric chloride: sodium bromide: dibutyl amine.
[b] Monomer leak rate in percent per hour of initial charge.

EXAMPLE 3

A one-liter reactor equipped with a 2¼ inch turbine-blade stirrer, condenser, thermometer well, cooling coils, and inlet ports for reaction solution and oxygen is charged with 450 ml of toluene and a catalyst solution is prepared by mixing 0.25 g. of cupric chloride, 0.3 g of sodium bromide, and 10.9 g of di-n-butylamine in 50 ml of toluene. Oxygen is introduced beneath the surface of the mixture at a rate of 1.5 cu. ft. per hour and a solution of 70 g of 2,6-xylenol in 70 g to toluene is added by means of a metering pump over a period of fifteen minutes. The temperature is maintained at 30° by circulating water from a constant-temperature bath through the cooling coil.

Seventy-five milliliters of a 2.8% solution of xylenol in toluene is added rapidly through the pump to clear the lines between pump and reactor and the pump is then adjusted to deliver xylenol at a rate equal to 2% of the initial charge per hour. Small samples are withdrawn periodically, killed with 50% aqueous acetic acid, and the polymer isolated by precipitation with methanol. The polymer is separated by filtration, washed with methanol, dried under vacuum, and the intrinsic viscosity is determined in chloroform solution at 30° C. The intrinsic viscosity 90 minutes after the start of the reaction is 0.35 dl/g, at 120 minutes 0.37 dl/g, and at 150 minutes 0.35 dl.g. A fifty-gram portion of the reaction mixture taken at 120 minutes yields 5.1 g of polymer, 99% of theoretical based on the total amount of xylenol added to this time.

EXAMPLE 4

A variation of this procedure is useful for preparation of polymer having very low intrinsic viscosity. In this procedure 90% of the original monomer charge is delivered to the reactor in fifteen minutes, and the remain-

EXAMPLE 5

A stirred ten-gallon reactor was charged with 4.0 gal. of toluene and a solution of 3.74 g of cuprous oxide in 86 g of 48% aqueous hydrobromic acid was added, followed by 17.9 g of N,N$^1$-di-tert-butylethylene diamine, 55.3 g of dibutylamine, 5.5 g of methyltrioctylammonium chloride, 211 g of dimethylbutylamine, and 2.8 liters of methanol containing 120 ml of water. Oxygen was introduced into the rapidly stirred solution and a solution of 12.2 lbs. of 2,6-xylenol in an equal weight of toluene was added over a period of 30 minutes, with the reaction temperature maintained at 105° F. by an external cooling loop. After one hour, the temperature was increased to 120° F. for the remainder of the reaction. About one minute before the addition of the monomer charge was completed, a slow leak of monomer was started through a second metering pump and the leak was continued throughout the run. At suitable intervals, small samples of the reaction mixture were withdrawn, shaken with a few drops of a 38% aqueous solution of the trisodium salt of ethylenediaminetetraacetic acid, and the polymer was precipitated by adidtion of methanol. The polymer was filtered off and dried, and its intrinsic viscosity was measured in chloroform solution at 30° C.

| Run No. | Leak Rate (%)* | Intrinsic Viscosity (dl/g) | | | |
|---|---|---|---|---|---|
| | | 60 Min. | 70 Min. | 80 Min. | 100 Min. |
| A | 0 | 0.43 | 0.51 | 0.60 | 0.64 |
| B | 0.625 | 0.38 | 0.51 | 0.51 | 0.51 |
| C | 1.25 | 0.21 | 0.33 | 0.40 | 0.40 |

| Run | Leak | Intrinsic Viscosity (dl/g) | | | |
|-----|------|--------|--------|--------|---------|
| No. | Rate (%)* | 60 Min. | 70 Min. | 80 Min. | 100 Min. |
| D | 2.5 | 0.30 | 0.35 | 0.36 | 0.35 |

*percent by weight per hour based on initial monomer charge of 12.2 lbs.

After 120 minutes, the intrinsic viscosity of the polymer in run B was 0.50 dl/g. At this time, 70 g of a 20% solution of the disodium salt of nitrilotriacetic acid was added, along with 2 liters of water, and the mixture was stirred for 30 minutes at 120° F., then centrifuged, and the polymer precipitated from the organic layer with methanol. The intrinsic viscosity of the product was 0.49 dl/g, almost unchanged. In other experiments carried in the same way, but without the monomer leak, the intrinsic viscosity of the polymer dropped by 0.05 to 0.10 dl/g in the first thirty minutes after addition of the chelating agent.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. A process for preparation of polyphenylene oxide polymer having a predetermined molecular weight, said process comprising the steps of:
   (a) adding oxygen to a reaction mixture comprising a main charge of a phenolic monomer, an oxidative coupling catalyst and a solvent; and
   (b) while continuing the addition of oxygen to the reaction mixture of step (a), adding to said reaction mixture an additional amount of phenolic monomer at a rate that is sufficient to control polymerization and producing a polyphenylene oxide polymer of a predetermined molecular weight.

2. A process as defined in claim 1 wherein the phenolic monomer has the formula:

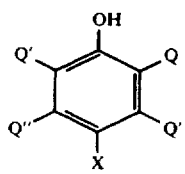

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus; hydrocarbonoxy radicals and halohydrocarbonoxy radicals having at least two carbon atoms between the halogen atom and the phenol nucleus; Q' and Q" are the same as Q and in addition may be halogen, with the proviso that Q, Q' and Q" are all free of a tertiary alpha-carbon atom.

3. A process as defined in claim 1 wherein the catalyst is a complex copper-amine catalyst.

4. A process as defined in claim 1 wherein the catalyst is a complex manganese catalyst of the formula $(L)_x Mn$ wherein L is hydroxyoxime ligand of the formula:

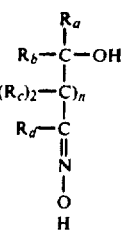

wherein $R_a$, $R_b$, $R_c$ and $R_d$ are independently selected from the group consisting of hydrogen, acyclic and cyclic hydrocarbon radicals, and n is a positive integer equal to 0 to 1, and x is a positive number at least equal to about 10.

5. A process as defined in claim 3 wherein the complex copper-amine catalyst is based on a copper compound and a primary or secondary amine.

6. A process as defined in claim 5 wherein the amine is a dialkyl amine.

7. A process as defined in claim 3 wherein the catalyst comprises
   (a) a copper compound
   (b) a diamine of the formula:

$$R^1HN-R^2-NHR^1$$

wherein each $R^1$ is independently isopropyl, a $C_{4-8}$ tertiary alkyl or a cycloalkyl group having no hydrogens on the alpha-carbon atom and $R^2$ is $C_{2-4}$ alkylene or $C_{3-7}$ cycloalkylene; and
   (c) a tertiary amine.

8. A process as defined in claim 3 wherein the copper-amine catalyst is derived from cuprous oxide, butyldimethylamine and N,N'-di-tert-butylethylenediamine.

9. A process as defined in claim 3 wherein the copper-amine catalyst is derived from cuprous oxide, butyldimethylamine and N,N'-di-tert-butylethylenediamine.

10. A process for the preparation of poly(2,6-dimethyl-1,4-phenylene oxide) polymer having a predetermined molecular weight, said process comprising the steps of:
    (a) adding oxygen to a reaction mixture comprising a main charge of a phenolic monomer, an oxidative coupling catalyst and a solvent; and
    (b) while continuing the addition of oxygen to the reaction mixture of step (a), adding to said reaction mixture an additional amount of phenolic monomer at a rate that is sufficient to control polymerization and producing a poly(2,6-dimethyl-1,4-phenylene oxide polymer of a predetermined molecular weight.

11. A process as defined in claim 10 wherein the catalyst is a manganese catalyst derived from manganese chloride and benzoin oxime.

12. A process for preparation of polyphenylene oxide polymer, having a predetermined molecular weight, said process comprising the steps of:
    (a) adding oxygen to a reaction mixture comprising a main charge of from 85 to 99.9% by weight of the total amount of monomer adding during the reaction of an oxidative coupling catalyst and a solvent; and
    (b) while continuing the addition of oxygen to the reaction mixture of step (a), adding to said reaction mixture at a rate of 0.2 to 15% by weight of the main phenolic monomer charge per hour of reaction time an additional amount of phenolic monomer, and controlling the polymerization and producing a polyphenylene oxide polymer of a predetermined molecular weight.

13. A process as defined in claim 12 wherein the phenolic monomer has the formula:

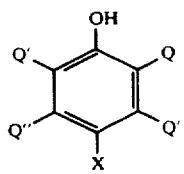

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus; hydrocarbonozy radicals and halohydrocarbonoxy radicals having at least two carbon atoms between the halogen atom and the phenol nucleus; Q' and Q'' are the same as Q and in addition may be halogen, with the proviso that Q, Q' and Q'' are all free of a tertiary alpha-carbon atom.

14. A process as defined in claim 12 wherein the catalyst is a complex copper-amine catalyst.

15. A process as defined in claim 12 wherein the catalyst is a complex manganese catalyst of the formula $(L)_x Mn$ wherein L is a hydroxyoxime ligand of the formula:

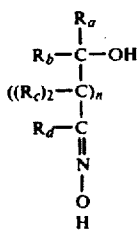

wherein $R_a$, $R_b$, $R_c$ and $R_d$ are independently selected from the group consisting of hydrogen, acyclic and cyclic hydrocarbon radicals, and n is a positive integer equal to 0 to 1, and x is a positive number at least equal to about 10.

16. A process as defined in claim 14 wherein the complex copper-amine catalyst is based on a copper compound and a primary or secondary amine.

17. A process as defined in claim 16 wherein the amine is a dialkyl amine.

18. A process as defined in claim 14 wherein the catalyst comprises
  (a) a copper compound
  (b) a diamine of the formula:

$$R^1 HN-R^2-NHR^1$$

wherein each $R^1$ is independently isopropyl, a $C_{4-8}$ tertiary alkyl or a cycloalkyl group having no hydrogens on the alpha-carbon atom and $R^2$ is $C_{2-4}$ alkylene or $C_{3-7}$ cycloalkylene; and
  (c) a tertiary amine.

19. A process as defined in claim 14 wherein the copper-amine catalyst is based on cupric chloride and di-n-butyl amine.

20. A process as defined in claim 14 wherein the copper-amine catalyst is based on cuprous oxide, butyldimethylamine and N,N'-di-tert-butylethylenediamine.

21. A process for the preparation of poly(2,6-dimethyl-1,4-phenylene oxide) polymer, having a predetermined molecular weight, said process comprising the steps of:
  (a) adding oxygen to a reaction mixture comprising a main charge of from 85 to 99.9% by weight of the total amount of monomer added during the reaction of a phenolic monomer, an oxidative coupling catalyst and a solvent; and
  (b) while continuing the addition of oxygen to the reaction mixture of step (a), adding to said reaction mixture at a rate of 0.2 to 15% by weight of the main phenolic monomer charge per hour of reaction time an additional amount of phenolic monomer, and controlling the polymerization and producing a poly(2,6-dimethyl-1,4-phenylene oxide polymer of a predetermined molecular weight.

22. A process as defined in claim 21 wherein the catalyst is a complex manganese catalyst based on manganese chloride and benzoin oxime.

* * * * *